UNITED STATES PATENT OFFICE.

WALTER J. BUDINGTON, OF HUDSON, ASSIGNOR TO H. JOSEPH BUDINGTON, OF KINGSTON, NEW YORK.

IMPROVEMENT IN THE MANUFACTURE OF HYDRAULIC CEMENT.

Specification forming part of Letters Patent No. 204,532, dated June 4, 1878; application filed April 27, 1878.

*To all whom it may concern:*

Be it known that I, WALTER J. BUDINGTON, of the city of Hudson, in the county of Columbia and State of New York, have invented a new and valuable Improvement in the Process of Making Cement; and I do hereby declare that the following is a full, clear, and exact description of the same.

The nature of my invention consists in a compound for Portland or hydraulic cement, and in the method or process for making the same, as will be hereinafter more fully set forth.

My cement is made from fossiliferous stone and a peculiar blue clay, which latter is found in the immediate vicinity of Hudson, in the State of New York, and at other places on the Hudson river, in the following manner:

The stone is fossiliferous limestone of the tertiary formation, and is also found in abundance in Columbia county, New York.

The proportions of the limestone and clay used in forming my cement are preferably as follows, to wit: for the first grade of cement, seventy-eight per cent. of stone and twenty-two per cent. of clay; for the second grade, seventy-six per cent. of stone and twenty-four per cent. of clay; for the third grade, seventy-five per cent. of stone and twenty-five per cent. of clay; and for the fourth grade, seventy-four per cent. of stone and twenty-six per cent. of clay.

It is obvious that the grades of the cement may be increased indefinitely by the use of relative proportions of the stone and clay; but it is anticipated that the second and third grades will be generally used.

The stone is reduced by suitable machinery to an impalpable powder, and the clay is also reduced in like manner. The powdered stone and clay are then weighed and suitable proportions of the two are intimately mixed together, after which water is added in sufficient quantity to make a rather stiff paste. The mass is then passed through a suitable brick-machine and molded in the form of bricks or any other desired form. The bricks, or molded mass, are placed in a dry-kiln, from which they are passed into a burning-kiln having a blower attached to produce a blast. Then, by a continuous burning, I produce for market the cement, it having been heated sufficient to produce semi-vitrification.

The cement thus produced I have found by experiment not only equals but surpasses the best imported Portland cement, and can be sold greatly below the price of such imported cement.

What I claim as new, and desire to secure by Letters Patent, is—

1. A cement made of fossiliferous stone and blue clay, substantially in the manner herein set forth.

2. The method of making cement from fossiliferous stone and blue clay, consisting essentially in reducing the stone and clay separately to an impalpable powder, then mixing the same and adding water, molding the mass, then drying the same, and finally burning it sufficiently to produce semi-vitrification, substantially as herein set forth.

In testimony that I claim the above I have hereunto subscribed my name in the presence of two witnesses.

WALTER J. BUDINGTON.

Witnesses:
HOWARD CHIPP,
M. SCHOONMAKER.